: 3,499,052
STYRENE AND/OR INDENE AND NORMAL ALPHA-OLEFIN COPOLYMER
David W. Young, Homewood, and Thomas J. Clough, Glenwood, Ill., assignors to Sinclair Research, Inc., New York, N.Y., a corporation of Delaware
No Drawing. Original application Aug. 22, 1966, Ser. No. 574,253. Divided and this application Aug. 30, 1968, Ser. No. 801,877
Int. Cl. C07f 19/04, 17/00; C10l 1/10
U.S. Cl. 260—669                                    2 Claims

ABSTRACT OF THE DISCLOSURE

Oil soluble polymers of styrene or indene and a normal alpha-olefin of 10–24 carbon atoms, useful as a pour point depressants in mineral oils, are disclosed.

---

This application is a division of Ser. No. 574,253, filed Aug. 22, 1966 which in turn is a continuation of Ser. No. 361,582 filed Apr. 21, 1964, and now abandoned, which a continuation-in-part of Ser. No. 235,146, filed Nov. 2, 1962, and now abandoned.

This invention relates to a novel hydrocarbon polymer having utility as a mineral oil pour point depressor. More specifically, the present invention is directed to a pour depressor which is an oil soluble polymer of styrene or indene and long chain, normal alpha-olefins.

It is known in the art to add pour depressors to mineral oil bases in order to permit their flow at low temperatures. Many different types of materials are known to depress the pour point of hydrocarbon oils but most have to be employed in disadvantageously large concentrations to provide the desired results. Moreover, although use of certain hydrocarbon polymers as pour depressors is known, most hydrocarbon polymers as demonstrated by U.S. Patent No. 3,048,479 to Ilnyckyj et al. are not effective as pour point depressors and many in fact increase the pour point.

It has now been found that a base oil compatible (i.e. soluble, miscible or dispersible) polymer of styrene, indene or their mixture and a normal alpha-olefin of 10 to 24, preferably 14 to 20, carbon atoms having at least about 60% of normal alpha-olefins of 16 to 18 carbon atoms, which polymer is normally liquid and has a kinematic viscosity at 210° F. of at least about 20 or at least about 35 centistokes, when added to a base mineral oil in small effective amounts, substantially reduces the pour point of the oil and in many instances the cloud point. Mixtures of normal alpha-olefins can be employed if desired in the polymerization as long as they contain at least 60% by weight, preferably at least about 70% and up to 97% by weight, of $C_{16}$ to $C_{18}$ normal alpha-olefins in the total alpha-olefin mixture. As will be demonstrated below, copolymers of styrene or indene and alpha-olefin mixtures which contain less than about 60% $C_{16}$ to $C_{18}$ alpha-olefins fail to provide an effective mineral oil pour point depressor. The alpha-olefin mixture can also contain small, minor amounts, preferably less than 10% by weight, of branched chain alpha-olefins and small amounts of other hydrocarbons such as other olefins, saturated hydrocarbons and aromatics.

The novel polymer of the present invention can be prepared by subjecting a mixture of styrene or indene and the alpha-olefin to a polymerization temperature of about 0 to 50° C., preferably 0 to 25° C., in the presence of the Friedel-Crafts catalyst such as aluminum chloride, aluminum bromide, titanium tetrachloride, boron trifluoride etherate, etc. The preferred catalysts are metal halides especially aluminum chloride. It is preferred that an inert diluent for the catalyst be also employed and when used will generally be present in an amount of about 0.5 to 5 volumes of diluent per volume of the styrene or indene alpha-olefin feed. Suitable inert normally liquid diluents are, for instance, the non-polymerizable alkenes of say up to 10 carbon atoms or the lower alkyl halides of 1 to 3 carbon atoms as, for example, methyl chloride, ethyl chloride, propyl chloride and the like. The Friedel-Crafts catalyst will generally be present in the catalyst solution in a concentration of about .5 to 10%, preferably about 2 to 5%, by weight, and the total amount of the catalyst employed is generally about 0.1 to 15% by weight, preferably about 2 to 10% by weight of the polymer formed.

The styrene or indene in the reactant mixture of the present invention constitutes about 2.5 to 35%, preferably about 5 to 25% by weight of the reactant mixture, while the long chain, normal alpha-olefins of the invention constitute the essential balance, e.g. about 65 to 97.5, preferably 75 to 95% by weight. The proportions of styrene or indene alpha-olefin mixtures to catalyst solution employed may be about 0.5 to 1 part of the mixture to 2.0 to 2.5 parts of the catalyst solution.

It is preferred to form the polymer of the present invention by a simultaneous addition of the catalyst solution and the mixture of styrene or indene and alpha-olefin to a reaction vessel in order to avoid monomeric polymerization of styrene. The volumetric ratio of catalyst solution to the olefin reactant at a given unit of time is preferably about 2 to 1.

After the addition has been completed the polymerization may be permitted to continue for a short period of time generally about 5 to 45 minutes to insure polymerization to a polymer product having a kinematic viscosity at 210° F. of say about 25 or 35 to 600 centistokes, preferably about 30 to 60 or even up to 300 centistokes. The polymerization reaction can then be quenched using for instance a lower alkane or lower alkanol, e.g. of 1 to 4 carbon atoms. The resulting polymer can be separated from residual catalyst as by washing with water, alcohol, dilute aqueous caustic soda or other suitable hydrolyzing and washing methods. The polymerization product is a light colored, viscous oil.

Among the mineral oil bases which are improved in accordance with this invention are liquid petroleum oils boiling primarily above the gasoline range and include, for instance, lubricating oils, diesel fuels, fuel oils, etc. These oils are usually petroleum middle distillates and commonly have relatively high pour points, for instance, at least about −10° F. or higher. The oils can be in their relatively crude state or they can be treated in accordance with well-known commercial methods such as acid or caustic treatment, solid refining clay treatment, etc. Fuel oils which can be improved by the polymers of this invention are, for instance, hydrocarbon fractions boiling primarily in the range of about 300° to 750° F. The fuel oils can be straight run distillate fuel oils, catalytically or thermally cracked distillate fuel oils or mixtures of straight run fuel oils, naphthas and the like with cracked distillate stocks. The cracked materials will frequently be about 15 to 70 volume percent of the fuel.

The amount of polymer added to the base oils is dependent upon the particular oil employed, but in all cases will be that sufficient to reduce the pour point. Often the amounts used will fall in the range of about .01 to 1% by weight or more, preferably about 0.05 to 0.5% by weight.

The following examples are included to further illustrate the present invention.

Example I

A 2-liter reaction flask was equipped with 2 dropping funnels and a Dry Ice trap to remove and condense from the polymerization system, the volatile ethyl chloride. One dropping funnel was charged with 120 ml. of a mixture of 1-octadecene and styrene containing 16% by weight styrene. To the remaining funnel was added 245 ml. of a saturated solution of $AlCl_3$ in ethyl chloride at 5° C. Both olefin mixture and catalyst solution were introduced into the 2-liter reaction flask at the same time, the olefin mixture at a rate of 19 ml./min., the catalyst solution at a rate of 38 ml./min. The total time for addition was 6 minutes, 20 seconds, and the polymerization was continued for an additional 34 minutes. 140 ml. of ethyl chloride was trapped out of the system during the polymerization. The volatile ethyl chloride acted as a coolant to hold the temperature of polymerization constant. 275 ml. of isopropyl alcohol was added to quench the catalyst and 275 ml. of hexane was added to dilute the polymer. The polymer was washed with $H_2O$ and stripped of solvents. The polymer had a KV at 210° F. of 43.08 centistokes and an iodine number of 15.3. Various amounts of the polymer obtained were blended with a fuel oil and the pour point and cloud point of each blend determined. The fuel oil employed was a blend of 50% straight run gas oil and 50% catalytically cracked gas oil analyzing as follows:

| | |
|---|---|
| API° gravity | 29.1 |
| Flash, Pensky-Martin, ° F. | 193 |
| ASTM distillation, ° F.: | |
| IBP | 400 |
| 10% | 493 |
| 50% | 570 |
| 90% | 615 |

For comparison determinations of the pour and cloud points, fuel oils without the additive are included. The results are shown below:

| Percent polymer | Pour point * (° F.) | Cloud point (° F.) |
|---|---|---|
| 0.20 | −55 | 0 |
| 0.10 | −40 | 0 |
| 0.05 | −15 | 0 |
| 0.00 | 0 | +4 |

*ASTM Method D-97-47.

Example II

The same equipment was used as in Example I. 140 ml. of a mixture of 1-octadecene and styrene containing 20% by weight styrene and 270 ml. of a saturated solution of $AlCl_3$ in ethyl chloride at 12° C. were added simultaneously to the reaction flask. The olefin mix was added at a rate of 23 ml./min., the catalyst solution at a rate of 45 ml./min. The total time for addition was 6 minutes and 160 ml. of ethyl chloride was trapped from the system during the polymerization. The reaction was continued for an additional 21 minutes at 12° C. and the polymer then quenched in isopropyl alcohol. The polymer was washed and stripped of solvents and had a KV at 210° F. of 47.74 centistokes and an iodine number of 14.1. Various amounts of the polymer were blended in the fuel oil of Example I and the pour and cloud points of each of the blends determined. The pour and cloud points of the base fuel are included for comparison. The results are shown below:

| Percent polymer | Pour point * (° F.) | Cloud point (° F.) |
|---|---|---|
| 0.20 | −50 | +4 |
| 0.10 | −40 | 0 |
| 0.05 | −25 | 0 |
| 0.00 | 0 | +6 |

*ASTM Method D-97-47.

Example III

To a mixture of alpha olefins of approximate composition

| Alpha-olefin: | Percent |
|---|---|
| $C_{12}$ | 7 |
| $C_{14}$ | 16 |
| $C_{16}$ | 40 |
| $C_{18}$ | 30 |
| $C_{20}$ | 7 | was added 11.5% by weight styrene. The equipment used was the same as in Example I except that a 1-liter reaction flask was employed. 121 ml. of the olefin mixture and 250 ml. of a saturated $AlCl_3$ in ethyl chloride at 12° C. were added simultaneously, the olefin mixture at a rate of 25.50 ml./min., the catalyst solution at a rate of 49 ml./min. The total time for addition was 5 minutes, 10 seconds and 130 ml. of ethyl chloride was trapped from the polymerization system. The reaction was quenched after an additional 12 minutes with 250 ml. of isopropyl alcohol. Hexane was added and the polymer washed with $H_2O$. The polymer after being stripped of solvents had a kinematic viscosity at 210° F. of 49.54 centistokes and an iodine number of 11.7. Various amounts of the polymer were blended in the fuel oil of Example I and the pour and cloud points of each of the blends determined. The results are shown below:

| Percent polymer | Pour point* (° F.) | Cloud point (° F.) |
|---|---|---|
| 0.20 | −65 | 0 |
| 0.10 | −50 | 0 |
| 0.05 | −20 | +2 |
| 0.00 | 0 | +4 |

*ASTM Method D-97-47.

Example IV

To a mixture of alpha olefins from tallow of approximate composition:

| Alpha-olefin: | Percent |
|---|---|
| $C_{14}$ | 4 |
| $C_{16}$ | 32 |
| $C_{18}$ | 64 | was added 20% by weight styrene. The equipment used was the same as in Example III. 140 ml. of the olefin mixture and 280 ml. of a saturated $AlCl_3$ in ethyl chloride solution at 12° C. were added simultaneously, the olefin mixture at a rate of 20 ml./min., the catalyst solution at a rate of 40 ml./min. The total time for addition was 7 minutes and the polymerization was continued for an additional 20 minutes. The reaction was quenched with 250 ml. of isopropyl alcohol. Hexane was added and the polymer washed with $H_2O$. The polymer after being stripped of solvents had a kinematic viscosity of 40.10 centistokes at 210° F. and an iodine number of 12.2. The polymer was blended in various amounts with the fuel oil of Example I and the pour and cloud points of each blend determined. The results were as follows:

| Percent polymer | Pour point* | Cloud point |
|---|---|---|
| 0.20 | −50 | +2 |
| 0.10 | −45 | +4 |
| 0.05 | −25 | +2 |

*ASTM Method D-97-47.

Example V

Various amounts of the polymer of Example I were blended with a petroleum lubricating oil having a viscosity of 43 SSU at 210° F., a viscosity index of 102, a pour point of 12° F. and a flash point of 490° F. The pour points of each of the blends were determined. The results are as follows:

| Pour point, ° F.[1]: | Polymer, percent |
|---|---|
| 12 | 0.00 |
| −5 | 0.08 |
| −12 | 0.10 |
| −15 | 0.15 |
| −25 | 0.20 |

[1] ASTM method D-97-47.

Example VI 20 g. of indene and 80 g. of octadecene-1 were polymerized at 15° C. in the presence of 275 mls. of a saturated solution of aluminum chloride in ethyl chloride. In the run the catalyst solution and olefin were added to a 1-liter round bottomed Pyrex glass at the same time. The feed rate for the olefin was 18 mls./min. while the addition rate for the catalyst solution was 38 mls./min. The polymerization was continued for an additional ten minutes after the additions of olefin and catalyst were completed and 222 mls. of ethyl chloride were trapped from the system during the reaction due to the heat of polymerization. Isopropyl alcohol, 250 mls., was added to quench the reaction and destroy the aluminum chloride activity, and then 250 mls. of hexane was added to dilute the system. The polymer in solution was stripped of solvent and washed with water. The dry polymer had a kinematic viscosity at 210° F. of 312 centistokes. Blends of 0.05% and 0.10% of the polymer in the fuel oil of Example I were prepared and the pour point of each of the blends determined. The results are shown below:

| Pour point,[1] ° F.: | Percent of polymer |
|---|---|
| 0 | 0 |
| −25 | 0.05 |
| −55 | 0.10 |

[1] ASTM method D-97-47.

The data of Examples I through VI demonstrate the advantageous pour properties provided both fuels and lubricating oils by the novel polymers of the present invention. The data further shows that the novel polymer in some cases also improves the cloud point.

Example VII

Polymers of styrene (20%) and each of the olefin (80%) mixtures A, B, C, and D identified in Table I below were prepared according to the following general procedure:

A 4-neck reaction flask was equipped with two graduated dropping funnels, a thermometer well, a 2-neck Claissen head, a Dean-Stark trap, a stirrer and a Dry-Ice condenser. A mixture of the olefin and styrene was introduced into the reaction flask from one dropping funnel and an ethyl chloride solution of aluminum chloride from the other dropping funnel. The solutions were introduced at measured rates and the contents of the flask were stirred throughout the addition period. Ethyl chloride, which evolved during the polymerization was condensed and collected in the Dean-Stark trap. The temperature of the reaction mixture was maintained at approximately 13° C. by the evaporation of ethyl chloride which boils at 12° C.

After the catalyst and olefin solutions were mixed, the contents of the flask were stirred for an additional period of time. At this point an equal volume of hexane was added to reduce the viscosity of the product and to facilitate product handling. The reaction was quenched by the addition of an equal volume of isopropanol. After quenching, two volumes of water were added and the hydrocarbon layer separated. The product was then washed three times with equal volumes of water. The solvents were stripped under vacuum on a steam bath. The physical properties of the polymers produced and the specific polymerization conditions utilized are summarized in Table I below.

TABLE I

| | Olefin composition | | | |
|---|---|---|---|---|
| | A | B | C | D |
| Total olefins, percent | 99 | 96 | 96 | 95+ |
| Total α-olefins, percent | 92–95 | 93 | 93 | 94 |
| Straight chain α-olefins, percent | 92–95 | 93 | 93 | 86 |
| Branched and naphthenic olefins, percent | | | | 3 |
| Straight chain α,ω-diolefins, percent | 0 | Nil | Nil | 6 |
| Saturated and aromatic hydrocarbon, percent | 1 | 4 | 4 | 4 |
| Specific gravity (60/60° F.) | 0.779 | 0.7735 | 0.7876 | [1] 0.790 |
| Color, Saybolt | | 30 | 30 | −12 |
| Iodine number | 104.9 | 131 | 107 | [2] 67 |
| Flash point, TOC | | 195 | 275 | 265 |
| Peroxide content, meq./l | 2.4 | 0.1 | 0.1 | 2 |
| Molecular weight distribution, wt. percent, number of carbons: | | | | |
| 10 | | 2 | | |
| 11 | | | | |
| 12 | | 38 | | |
| 13 | | | | |
| 14 | 5.0 | 29 | 3 | 1 |
| 15 | | | | 12 |
| 16 | 31.1 | 20 | 62 | 19 |
| 17 | | | | 18 |
| 18 | 63.1 | 10 | 34 | 18 |
| 19 | | | | 17 |
| 20 | 0.8 | 1 | 1 | 14 |
| 21 | | | | 1 |

[1] Density, 20° C.g./ml.
[2] Bromine number.

Various amounts of each of the polymers prepared were blended in a No. 2 fuel similar to that of Example I and the pour point of each of the blends determined. The pour point of the base fuel is included for comparison. The results are shown in Table II.

TABLE II.—COPOLYMERIZATION OF STYRENE AND α-OLEFINS

| | Run No. | | | | | | |
|---|---|---|---|---|---|---|---|
| | 1 | 2 | 3 | 4 | 5 | 6 | 7 |
| Olefin | A | A | A | A | C | B | D |
| Amount of olefin, ml | 157 | 113 | 279 | 505 | 230 | 21 | 230 |
| Rate of olefin addition, ml./min | 19.6 | 9.4 | 9.3 | 10.1 | 23.0 | 215 | 23.0 |
| Catalyst solution, ml | 312 | 230 | 570 | 1000 | 430 | 395 | 420 |
| Rate of catalyst addition, ml./min | 39.0 | 19.2 | 19.0 | 20.0 | 43.0 | 39.5 | 42.0 |
| Concentration of AlCl₃ in ethyl chloride, wt. percent | 5.15 | 5.15 | 5.15 | 5.15 | 5.15 | 5.15 | 5.15 |
| Temperature of polymerization, ° C | 13 | 13 | 13 | 13 | 13 | 13 | 13 |
| Ethyl chloride trapped, ml | 190 | 135 | 350 | 632 | 220 | 225 | 232 |
| Vol. percent ethyl chloride trapped | 64 | 62 | 65 | 67 | 54 | 60 | 58 |
| Total time of addition, min | 8 | 12 | 30 | 50 | 10 | 10 | 10 |
| Total time of additional stirring, min | 15 | 12 | 12 | 12 | 14 | 16 | 12 |
| KV at 100° F., cs | 456.5 | 546.8 | 528.5 | 337.4 | 285.8 | 309.1 | 560.1 |
| KV at 210° F., cs | 41.3 | 49.1 | 42.8 | 34.6 | 30.0 | 29.8 | 48.9 |
| Iodine number | 14.1 | 11.4 | 10.7 | 8.3 | | | |
| Pour point (D-97-57), ° F., of No. 2 fuel containing polymer at the following concentrations: | | | | | | | |
| 0.00 vol. percent | −5 | −5 | −5 | −5 | −5 | −5 | −5 |
| 0.01 vol. percent | −15 | −15 | −15 | −15 | −10 | −5 | −5 |
| 0.03 vol. percent | −30 | −50 | −50 | −40 | −20 | −5 | −5 |
| 0.05 vol. percent | −45 | −50 | −50 | −50 | −45 | −5 | −5 |

The data of Table II show the importance of the $C_{16}$ to $C_{18}$ alpha-olefins in producing a styrene alpha-olefin polymer having effective pour depressant properties. Olefin mixtures A and C which contained 92.5 and 96% $C_{16}$ to $C_{18}$ alpha-olefins, respectively, on polymerization with styrene provided excellent pour depressors. Olefin mixtures B and D on the other hand, containing 30% and 55% $C_{16}$ to $C_{18}$ alpha-olefins, respectively, failed on polymerization with styrene to provide an effective pour depressor.

It is claimed:

1. An oil-soluble polymer of about 2.5 to 35% by weight of a compound selected from the group consisting of styrene and indene and about 65 to 97.5% by weight normal alpha-olefin of 10 to 24 carbon atoms with at least about 60% being in the 16 to 18 carbon atom range, said polymer having a kinematic viscosity of 210° F. of about 20 to 600 centistokes.

2. The polymer of claim 1 having about 5 to 25% of styrene and about 75 to 95% by weight of normal alpha-olefin of about 14 to 20 carbon atoms with at least about 70% being in the 16 to 18 carbon atom range and the polymer has a kinematic viscosity at 210° F. of about 30 to 60 centistokes.

References Cited

UNITED STATES PATENTS 2,468,500    4/1949    Lieber et al. _____ 260—671 XR
3,157,624   11/1964    deVries et al. _____ 260—88.2

DELBERT E. GANTZ, Primary Examiner

CURTIS R. DAVIS, Assistant Examiner

U.S. Cl. X.R.

260—88.2